(12) United States Patent
Chiu

(10) Patent No.: US 9,690,990 B2
(45) Date of Patent: Jun. 27, 2017

(54) ELECTRONIC DEVICE AND METHOD FOR CLASSIFING IMAGES

(71) Applicant: FIH (HONG KONG) LIMITED, Kowloon (HK)

(72) Inventor: Chien-Sheng Chiu, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 125 days.

(21) Appl. No.: 14/692,426

(22) Filed: Apr. 21, 2015

(65) Prior Publication Data

US 2016/0189001 A1 Jun. 30, 2016

(30) Foreign Application Priority Data

Dec. 31, 2014 (TW) .................................. 103146691

(51) Int. Cl.
*G06K 9/62* (2006.01)
*G06K 9/00* (2006.01)

(52) U.S. Cl.
CPC ..... *G06K 9/00671* (2013.01); *G06K 2209/27* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,697,502 B2* | 2/2004 | Luo | ................. | G06K 9/00228 382/115 |
| 7,519,200 B2* | 4/2009 | Gokturk | ............ | G06F 17/30253 382/118 |
| 8,139,900 B2* | 3/2012 | Gokturk | ............ | G06F 17/30253 382/278 |
| 8,625,904 B2* | 1/2014 | Das | ................... | G06F 17/30056 382/218 |
| 9,042,646 B2* | 5/2015 | Das | ................... | G06F 17/30056 382/170 |
| 9,058,540 B2* | 6/2015 | Wu | ....................... | G06K 9/4652 |
| 9,460,524 B1* | 10/2016 | Curlander | ............... | G06T 7/602 |
| 2002/0076100 A1* | 6/2002 | Luo | .................... | G06K 9/00228 382/164 |
| 2006/0251292 A1* | 11/2006 | Gokturk | ............ | G06F 17/30253 382/103 |
| 2010/0310157 A1* | 12/2010 | Kim | .................. | G06K 9/00335 382/159 |
| 2013/0051670 A1* | 2/2013 | Das | ................... | G06F 17/30056 382/170 |

FOREIGN PATENT DOCUMENTS

TW 200939120 A1 9/2009
TW 201222278 A1 6/2012

* cited by examiner

*Primary Examiner* — Anand Bhatnagar
(74) *Attorney, Agent, or Firm* — Steven Reiss

(57) ABSTRACT

A method of classifying images includes extracting parameters from each of the images. The parameters of each image is quantized. Once the quantization data of each image is obtained, each image is classified according to quantization data.

12 Claims, 3 Drawing Sheets

ELECTRONIC DEVICE AND METHOD FOR CLASSIFING IMAGES

CROSS-REFERENCE TO RELATED APPLICATIONS

This application claims priority to Taiwanese Patent Application No. 103146691 filed on Dec. 31, 2014, the contents of which are incorporated by reference herein.

FIELD

The subject matter herein generally relates to image management technology, and particularly to an electronic device and a method for classifying images using the electronic device.

BACKGROUND

An electronic device that includes a camera can be used to capture images. The electronic device can store lots of images which need to be classified according to user requirements.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
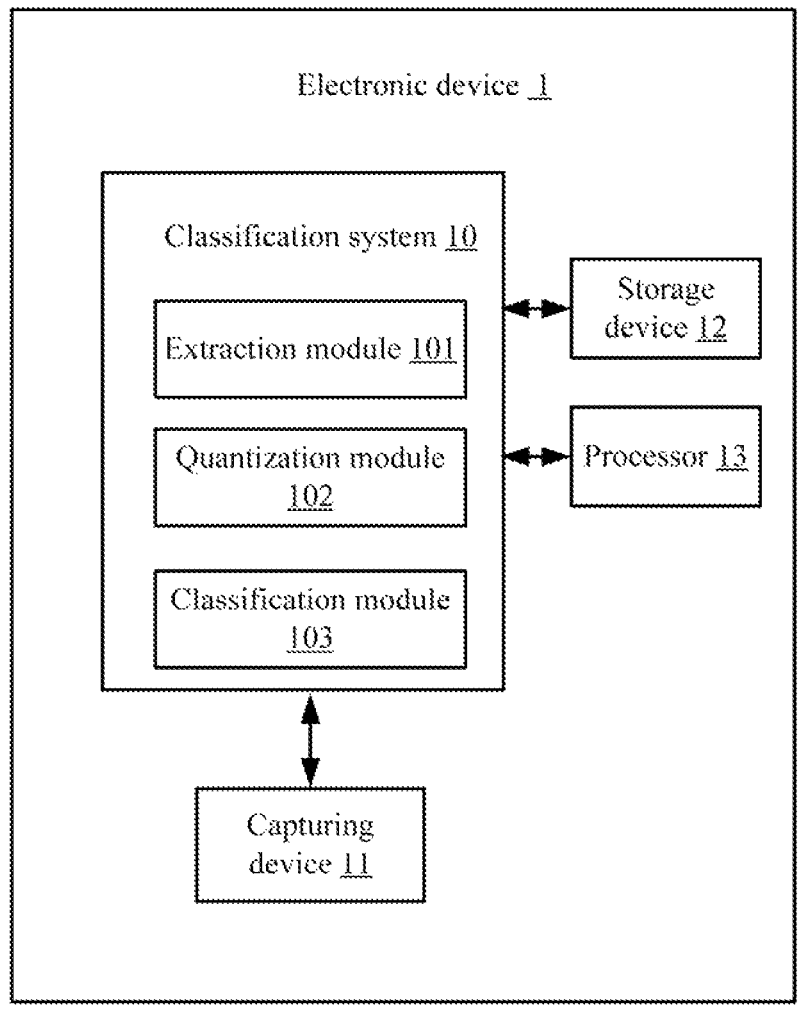
FIG. 1 is a block diagram of one embodiment of an electronic device including a classification system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of an electronic device. Depending on the embodiment, an electronic device 1 includes a classification system 10, a capturing device 11, a storage device 12, and at least one processor 13. The electronic device 1 can be a smart phone, a personal digital assistant (PDA), a tablet computer, or any other suitable electronic device. FIG. 1 illustrates only one example of the electronic device 1 that can include more or fewer components than illustrated, or have a different configuration of the various components in other embodiments.

The storage device 12 can be used to store images that are captured by the capturing device 11. In one embodiment, the capturing device 11 can be a camera.

In one embodiment, the storage device 12 can be an internal storage device, such as a flash memory, a random access memory (RAM) for temporary storage of information, and/or a read-only memory (ROM) for permanent storage of information. The storage device 12 can also be an external storage device, such as an external hard disk, a storage card, or a data storage medium.

The at least one processor 13 can be a central processing unit (CPU), a microprocessor, or other data processor chip that performs functions of the electronic device 1.

The classification system 10 can classify the images according to user requirements. In at least one embodiment, the classification system 10 can include an extraction module 101, a quantization module 102, and a classification module 103. The function modules 101-103 can include computerized codes in the form of one or more programs, which are stored in the storage device 12, and are executed by the at least one processor 13 of the electronic device 1 to classify the images. Details will be given in the following paragraphs.

The extraction module 101 predetermines parameters for classifying the images, and extracts the parameters from each of the images.

In one embodiment, the parameters can include, but are not limited to, captured time, a captured position, a value of red (R) channel, a value of green (G) channel, a value of blue (B) channel, and/or a human face detection result of each of the images.

In one embodiment, the extraction module 101 provides a menu to show the parameters, and determines one or more parameters according to user selections from the menu.

The quantization module 102 quantizes the parameters of each of the images to obtain quantization data of each of the images. The quantization module 102 may quantize the parameters selected from the above mentioned menu.

In one embodiment, the quantization module 102 obtains quantization data of the captured time of each of the images by converting the captured time to be numerals. For example, the quantization module 102 converts a captured time of "Dec. 22, 2014" of an image "A" to be "20141222", then the quantization module 102 obtains quantization data "20141222" of the captured time of "Dec. 22, 2014".

In one embodiment, the quantization module 102 obtains quantization data of the captured position of each of the images by obtaining numerals that indicate longitude and latitude of the captured position. For example, the quantization module 102 obtains quantization data "(39.55, 116.24)" of a captured position whose longitude is 116.24, and latitude is 39.55 of the image "A".

In one embodiment, the quantization module 102 obtains quantization data of the value of red (R) channel of each of the images, by calculating an average value of the red (R) channel of each of the images. The quantization module 102 obtains quantization data of the value of green (G) channel of each of the images, by calculating an average value of the green (G) channel of each of the images. The quantization module 102 obtains quantization data of the value of blue (B) channel of each of the images, by calculating an average value of the blue (B) channel of each of the images. Then, the quantization module 102 integrates the quantization data of the value of red (R) channel of each of the images, the quantization data of the value of green (G) channel of each of the images, and the quantization data of the value of blue (B) channel of each of the images.

For example, the quantization module 102 obtains quantization data "(135, 222, 23)" of the value of red (R) channel, the value of green (G) channel, and the value of blue (B) channel of the image "A", when the average value of red (R) channel of the image "A" is "135", and the average value of green (G) channel of the image "A" is "222", and the average value of blue (B) channel of the image "A" is "23".

In one embodiment, the quantization module 102 obtains quantization data of human face detection result of each of the images by marking different human faces using different numerals.

For example, the quantization module 102 obtains quantization data "0" of human face detection result of the image "A", when the image "A" includes no human face. The quantization module 102 obtains quantization data "1" of human face detection result of the image "A", when the image "A" includes a first human face of a first person. Similarly, the quantization module 102 obtains quantization data "2" of human face detection result of an image "B", when the image "B" includes a second human face of a second person.

In one embodiment, the quantization module 102 records the obtained quantization data of each of the images using an array. For example, the quantization module 102 records the obtained quantization data of the image "A" using an array 【20141222, (39.55, 116.24), 1, (135, 222, 23)】, wherein the "20141222" represents the quantization data of the captured time of the image "A", the "(39.55, 116.24)" represents the quantization data of the captured position of the image "A", the "1" represents the quantization data of human face detection result of the image "A", and the "(135, 222, 23)" represents the quantization data of the value of red (R) channel, the value of green (G) channel, and the value of blue (B) channel of the image "A".

The classification module 103 classifies the images according to the quantization data of each of the images.

In at least one embodiment, the classification module 103 sets a number of groups, selects an image for each of the groups from the images, and sets quantization data of the selected image to be reference data of each of the groups.

In one embodiment, the classification module 103 sets the number of groups according to the user requirements. For example, the classification module 103 sets the number of groups to be "2". For simplification, it is assumed that two groups are preset in following embodiments as provided below.

In one embodiment, the classification module 103 randomly selects the image for each of the groups from the images. In other embodiments, the classification module 103 selects the image for each of the groups from the images according to a user selection. The classification module 103 selects different images for different groups.

For example, the classification module 103 randomly selects the image "A" for a first group, and sets the quantization data of the image "A" to be reference data of the first group. The classification module 103 further randomly selects the image "B" for a second group, and sets quantization data of the image "B" to be reference data of the second group.

The classification module 103 calculates a difference value between quantization data of one of the images and the reference data of each of the groups using a predetermined formula. The classification module 103 determines a minimum difference value for the image, and executes a first classification of the image by allocating the image to a group that corresponds to the minimum difference value. The classification module 103 can determine a minimum difference value for each of the images by repeating above mentioned procedure, thus, each of the images can be classified into a group corresponding to the minimum difference value of each of the images.

In one embodiment, the predetermined formula is $$d_{ij} = \sqrt{\sum_{k=1}^{n} (A_{ik} - A_{jk})^2}.$$

In the predetermined formula, "$A_{ik}$" represents the reference data of each of the groups, and "$A_{jk}$" represents the quantization data of each of the images.

For example, the classification module 103 calculates a first difference value between quantization data of an image "m" and the reference data of the first group using the predetermined formula. The classification module 103 calculates a second difference value between the quantization data of the image "m" and the reference data of the second group using the predetermined formula. If the first difference value is less than the second difference value, the classification module 103 determines that the first difference value is the minimum difference value of the image "m", and allocates the image "m" to the first group corresponding to the minimum difference value of the image "m".

For another example, the classification module 103 calculates a third difference value between quantization data of an image "n" and the reference data of the first group using the predetermined formula. The classification module 103 calculates a fourth difference value between the quantization data of the image "n" and the reference data of the second group using the predetermined formula. If the fourth difference value is less than the third difference value, the classification module 103 determines the fourth difference value is the minimum difference value of the image "n", and allocates the image "n" to the second group corresponding to the minimum difference value of the image "n". Similarly, the classification module 103 allocates each of the other images to a group corresponding to a minimum difference value of the each of the other images, to finish executing the first classification of the images.

In one embodiment, when the classification module 103 has finished executing the first classification of the images, the classification module 103 further calculates average quantization data of images in each of the groups, and sets the average quantization data of each of the groups to be updated reference data of each of the groups.

For example, it is assumed that the first group includes three images after the first classification of the images, and quantization data of the three images are "(5, 10, 15)", "(6, 11, 16)", and "(7, 12, 17)". The classification module 103 obtains average quantization data "(6, 11, 16)" of the first group by calculating [(5+6+7)/3, (10+11+12)/3, (15+16+17)/3]. Then the classification module 103 sets the average quantization data "(6, 11, 16)" of the first group to be updated reference data of the first group.

In one embodiment, the classification module 103 further determines whether updated reference data of each of the groups is within a predetermined ratio range (for example, ±0.05%) of the reference data of each of the groups. When updated reference data of one of the groups is not within the predetermined ratio range of the reference data of the one of the groups, the classification module 103 calculates an updated difference value between the quantization data of each of the images and the updated reference data of each of the groups using the predetermined formula.

For example, it is assumed that the updated reference data of the first group is "(6, 11, 16)", and the reference data of the group one is "(135, 222, 23)". The classification module 103 determines that the "(6, 11, 16)" is not within the predetermined ratio range of "(135, 222, 23)", as "6" is not within 【135*(1−0.05%)】−【135*(1+0.05%)】, "11" is not within 【222*(1−0.05%)】−【222*(1+0.05%)】, and "16" is not within 【23*(1−0.05%)】−【23*(1+0.05%)】. Then the classification module 103 calculates the updated difference value between the quantization data of each of the images and the updated reference data of each of the groups using the predetermined formula.

In other embodiments, the classification module 103 determines whether updated reference data of each of the groups is equal to the reference data of each of the groups. When updated reference data of one of the groups is not equal to the reference data of the group, the classification module 103 calculates the updated difference value between the quantization data of each of the images and the updated reference data of each of the groups using the predetermined formula.

The classification module 103 determines a minimum updated difference value for each of the images, and executes a secondary classification of the images by allocating each of the images to a group corresponding to the minimum updated difference value of each of the images.

For example, when a fifth difference value between the quantization data of the image "A" and the updated reference data of the first group is greater than a sixth difference value between the quantization data of the image "A" and the updated reference data of the second group, the classification module 103 determines the sixth difference value is the minimum updated difference value of the image "A", and moves the image "A" from the first group to the second group. Similarly, the classification module 103 allocates each of the other images to a group corresponding to a minimum updated difference value of each of the other images, to execute the secondary classification of the images.

Figure 2:
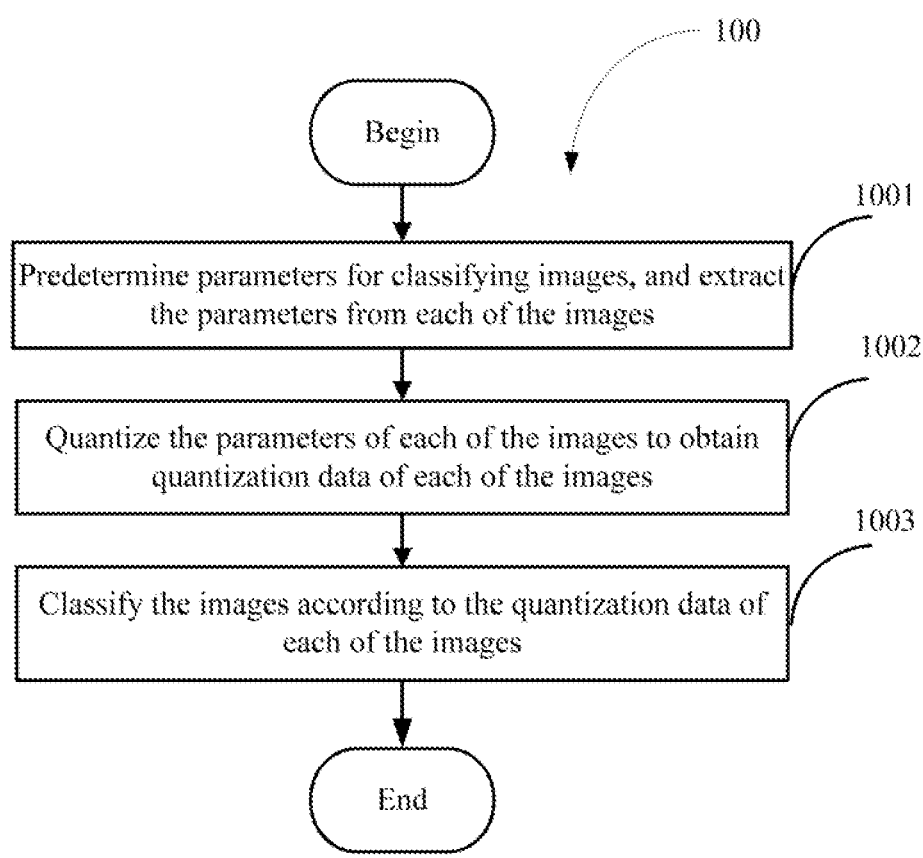
FIG. 2 illustrates a flowchart of one embodiment of a method for classifying images using the electronic device of FIG. 1.

FIG. 2 illustrates a flowchart is presented in accordance with an example embodiment. The example method 100 is provided by way of example, as there are a variety of ways to carry out the method. The method 100 described below can be carried out using the configurations illustrated in FIG. 1, for example, and various elements of these figures are referenced in explaining example method 100. Each block shown in FIG. 2 represents one or more processes, methods or subroutines, carried out in the exemplary method 100. Additionally, the illustrated order of blocks is by example only and the order of the blocks can be changed according to the present disclosure. The exemplary method 100 can begin at block 1001. Depending on the embodiment, additional steps can be added, others removed, and the ordering of the steps can be changed.

At block 1001, an extraction module 101 predetermines parameters for classifying the images, and extracts the parameters from each of the images.

In one embodiment, the parameters may include, but are not limited to, captured time, a captured position, a value of red (R) channel, a value of green (G) channel, a value of blue (B) channel, and/or a human face detection result of each of the images. In one embodiment, the extraction module provides a menu to show the parameters, and determines one or more parameters according to user selections from the menu.

At block 1002, a quantization module quantizes the parameters of each of the images to obtain quantization data of each of the images. The quantization module may quantize the parameters selected from the above mentioned menu.

In one embodiment, the quantization module obtains quantization data of the captured time of each of the images by converting the captured time to be numerals. For example, the quantization module converts a captured time of "Dec. 22, 2014" of an image "A" to be "20141222", then the quantization module obtains quantization data "20141222" of the captured time of "Dec. 22, 2014".

In one embodiment, the quantization module obtains quantization data of the captured position of each of the images by obtaining numerals that indicate longitude and latitude of the captured position. For example, the quantization module obtains quantization data "(39.55, 116.24)" of a captured position whose longitude is 116.24, and latitude is 39.55 of the image "A".

In one embodiment, the quantization module obtains quantization data of the value of red (R) channel of each of the images, by calculating an average value of the red (R) channel of each of the images. The quantization module obtains quantization data of the value of green (G) channel of each of the images, by calculating an average value of the green (G) channel of each of the images. The quantization module obtains quantization data of the value of blue (B) channel of each of the images, by calculating an average value of the blue (B) channel of each of the images. Then, the quantization module integrates the quantization data of the value of red (R) channel of each of the images, the quantization data of the value of green (G) channel of each of the images, and the quantization data of the value of blue (B) channel of each of the images.

For example, the quantization module obtains quantization data "(135, 222, 23)" of the value of red (R) channel, the value of green (G) channel, and the value of blue (B) channel of the image "A", when the average value of red (R) channel of the image "A" is "135", and the average value of green (G) channel of the image "A" is "222", and the average value of blue (B) channel of the image "A" is "23".

In one embodiment, the quantization module obtains quantization data of human face detection result of each of the images by marking different human faces using different numerals.

For example, the quantization module obtains quantization data "0" of human face detection result of the image "A", when the image "A" includes no human face. The quantization module obtains quantization data "1" of human face detection result of the image "A", when the image "A" includes a first human face of a first person. Similarly, the quantization module obtains quantization data "2" of human face detection result of an image "B", when the image "B" includes a second human face of a second person.

In one embodiment, the quantization module records the obtained quantization data of each of the images using an array. For example, the quantization module records the obtained quantization data of the image "A" using an array 【20141222, (39.55, 116.24), 1, (135, 222, 23)】, wherein the "20141222" represents the quantization data of the captured time of the image "A", the "(39.55, 116.24)" represents the quantization data of the captured position of the image "A", the "1" represents the quantization data of human face detection result of the image "A", and the "(135, 222, 23)" represents the quantization data of the value of red (R) channel, the value of green (G) channel, and the value of blue (B) channel of the image "A".

At block 1003, a classification module classifies the images according to the quantization data of each of the images. More details of the block 1003 will be provided in FIG. 3.

Figure 3:
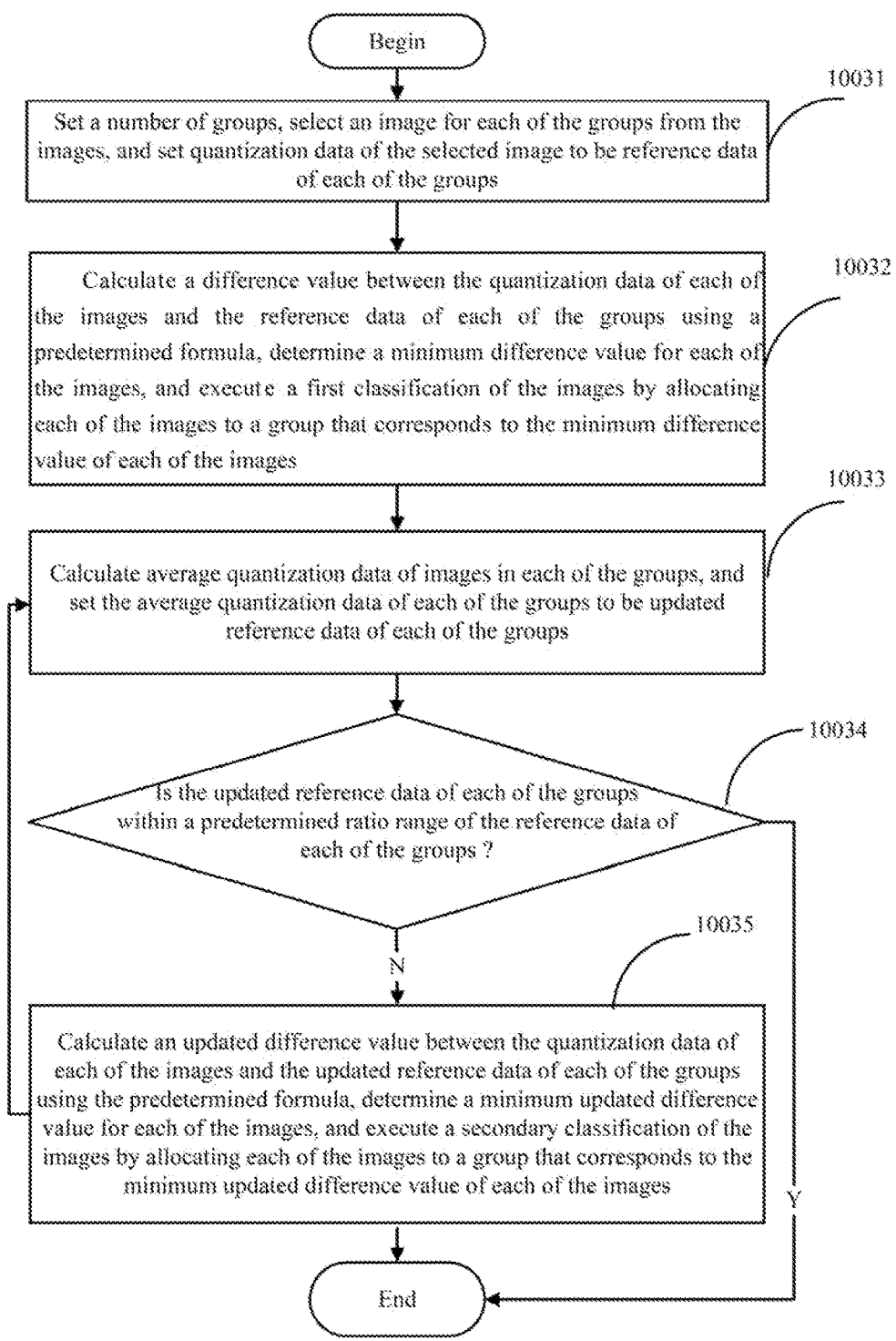
FIG. 3 illustrates a detailed description of block 1003 of FIG. 2.

FIG. 3 illustrates a further explanation of the block 1003.

At block 10031, in at least one embodiment, the classification module sets a number of groups, selects an image for each of the groups from the images, and sets quantization data of the selected image to be reference data of each of the groups.

In one embodiment, the classification module sets the number of groups according to the user requirements. For example, the classification module sets the number of groups to be "2". For simplification, it is assumed that two groups are preset in following embodiments as provided below.

In one embodiment, the classification module randomly selects the image for each of the groups from the images. In other embodiments, the classification module selects the image for each of the groups from the images according to a user selection. The classification module selects different images for different groups.

For example, the classification module randomly selects the image "A" for a first group, and sets the quantization data of the image "A" to be reference data of the first group. The classification module further randomly selects the image "B" for a second group, and sets quantization data of the image "B" to be reference data of the second group.

At block 10032, the classification module calculates a difference value between quantization data of one of the images and the reference data of each of the groups using a predetermined formula. The classification module determines a minimum difference value for the image, and executes a first classification of the image by allocating the image to a group that corresponds to the minimum difference value. The classification module can determine a minimum difference value for each of the images by repeating above mentioned procedure, thus, each of the images can be classified into a group corresponding to the minimum difference value of each of the images.

In one embodiment, the predetermined formula is $$d_{ij} = \sqrt{\sum_{k=1}^{n} (A_{ik} - A_{jk})^2} .$$

In the predetermined formula, "$A_{ik}$" represents the reference data of each of the groups, and "$A_{jk}$" represents the quantization data of each of the images.

For example, the classification module calculates a first difference value between quantization data of an image "m" and the reference data of the first group using the predetermined formula. The classification module calculates a second difference value between the quantization data of the image "m" and the reference data of the second group using the predetermined formula. If the first difference value is less than the second difference value, the classification module determines that the first difference value is the minimum difference value of the image "m", and allocates the image "m" to the first group corresponding to the minimum difference value of the image "m".

For another example, the classification module calculates a third difference value between quantization data of an image "n" and the reference data of the first group using the predetermined formula. The classification module calculates a fourth difference value between the quantization data of the image "n" and the reference data of the second group using the predetermined formula. If the fourth difference value is less than the third difference value, the classification module determines the fourth difference value is the minimum difference value of the image "n", and allocates the image "n" to the second group corresponding to the minimum difference value of the image "n". Similarly, the classification module allocates each of the other images to a group corresponding to a minimum difference value of the each of the other images, to finish executing the first classification of the images.

At block 10033, the classification module further calculates average quantization data of images in each of the groups, and sets the average quantization data of each of the groups to be updated reference data of each of the groups.

For example, it is assumed that the first group includes three images after the first classification of the images, and quantization data of the three images are "(5, 10, 15)", "(6, 11, 16)", and "(7, 12, 17)". The classification module 103 obtains average quantization data "(6, 11, 16)" of the first group by calculating [(5+6+7)/3, (10+11+12)/3, (15+16+17)/3]. Then the classification module sets the average quantization data "(6, 11, 16)" of the first group to be updated reference data of the first group.

At block 10034, in one embodiment, the classification module determines whether updated reference data of each of the groups is within a predetermined ratio range (for example, ±0.05%) of the reference data of each of the groups. When updated reference data of one of the groups is not within the predetermined ratio range of the reference data of the one of the groups, the process goes to block 10035. When updated reference data of each of the groups is within the predetermined ratio range of the reference data of each of the groups, the process ends.

For example, it is assumed that the updated reference data of the first group is "(6, 11, 16)", and the reference data of the group one is "(135, 222, 23)". The classification module determines that the "(6, 11, 16)" is not within the predetermined ratio range of "(135, 222, 23)", as "6" is not within 【135*(1−0.05%)】−【135*(1+0.05%)】, "11" is not within 【222*(1−0.05%)】−【222*(1+0.05%)】, and "16" is not within 【23*(1−0.05%)】−【23*(1+0.05%)】. Then the process goes to block 10035.

In other embodiments, the classification module determines whether updated reference data of each of the groups is equal to the reference data of each of the groups. When updated reference data of one of the groups is not equal to the reference data of the group, the process goes to block 10035. When updated reference data of each of the groups is equal to the reference data of each of the groups, the process ends.

At block 10035, the classification module calculates an updated difference value between the quantization data of each of the images and the updated reference data of each of the groups using the predetermined formula. The classification module determines a minimum updated difference value for each of the images, and executes a secondary classification of the images by allocating each of the images to a group corresponding to the minimum updated difference value of each of the images. When the secondary classification of the images is finished by the classification module, the process goes back to block 10033.

For example, when a fifth difference value between the quantization data of the image "A" and the updated reference data of the first group is greater than a sixth difference value between the quantization data of the image "A" and the updated reference data of the second group, the classification module determines the sixth difference value is the minimum updated difference value of the image "A", and moves the image "A" from the first group to the second group. Similarly, the classification module allocates each of the other images to a group corresponding to a minimum updated difference value of each of the other images, to execute the secondary classification of the images.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for classifying images using an electronic device, the method comprising:
   extracting parameters from each of the images via a processor of the electronic device;
   quantizing the parameters of each of the images to obtain quantization data of each of the images; and
   classifying the images according to the quantization data of each of the images;
   wherein the images are classified by:
   setting a number of groups;
   selecting an image for each of the groups from the images;
   setting quantization data of the selected image to be reference data of each of the groups;
   calculating a difference value between the quantization data of each of the images and the reference data of each of the groups using a predetermined formula;
   determining a minimum difference value for each of the images; and
   executing a first classification of the images by allocating each of the images to a group that corresponds to the minimum difference value of each of the images.

2. The method according to claim 1, wherein after executing the first classification of the images, the images are further classified by:
   (a) calculating average quantization data of the images in each of the groups, and setting the average quantization data of each of the groups to be updated reference data of each of the groups;
   (b) determining whether the updated reference data of each of the groups is within a predetermined ratio range of the reference data of each of the groups;
   (c) when the updated reference data of one of the groups is not within the predetermined ratio range of the reference data of the group, calculating an updated difference value between the quantization data of each of the images and the updated reference data of each of the groups using the predetermined formula;
   (d) determining a minimum updated difference value for each of the images, and executing a secondary classification of the images by allocating each of the images to a group that corresponds to the minimum updated difference value of each of the images; and
   (e) returning to (a) until the updated reference data of each of the groups is within the predetermined ratio range of the reference data of each of the groups.

3. The method according to claim 1, wherein the parameters of each of the images comprise at least one of a captured time, a captured position, a value of red (R) channel, a value of green (G) channel, a value of blue (B) channel, and a human face detection result of each of the images.

4. The method according to claim 1, wherein the quantization data of each of the images is recorded using an array.

5. An electronic device comprising:
   at least one processor;
   a storage device that stores images, the storage device being configured to store one or more programs that, when executed by the at least one processor, cause the at least one processor to:
   extract parameters from each of the images;
   quantize the parameters of each of the images to obtain quantization data of each of the images; and
   classify the images according to the quantization data of each of the images;
   wherein the images are classified by:
   setting a number of groups;
   selecting an image for each of the groups from the images;
   setting quantization data of the selected image to be reference data of each of the groups;
   calculating a difference value between the quantization data of each of the images and the reference data of each of the groups using a predetermined formula;
   determining a minimum difference value of each for the images; and
   executing a first classification of the images by allocating each of the images to a group that corresponds to the minimum difference value of each of the images.

6. The electronic device according to claim 5, wherein after executing the first classification of the images, the images are further classified by:
   (a) calculating average quantization data of the images in each of the groups, and setting the average quantization data of each of the groups to be updated reference data of each of the groups;
   (b) determining whether the updated reference data of each of the groups is within a predetermined ratio range of the reference data of each of the groups;
   (c) when the updated reference data of one of the groups is not within the predetermined ratio range of the reference data of the group, calculating an updated difference value between the quantization data of each of the images and the updated reference data of each of the groups using the predetermined formula;
   (d) determining a minimum updated difference value for each of the images, and executing a secondary classification of the images by allocating each of the images to a group that corresponds to the minimum updated difference value of each of the images; and (e) returning to (a) until the updated reference data of each of the groups is within the predetermined ratio range of the reference data of each of the groups.

7. The electronic device according to claim 6, wherein the parameters of each of the images comprise at least one of a captured time, a captured position, a value of red (R) channel, a value of green (G) channel, a value of blue (B) channel, and a human face detection result of each of the images.

8. The electronic device according to claim 5, wherein the quantization data of each of the images is recorded using an array.

9. A non-transitory storage medium having instructions stored thereon for classifying images that, when executed by a processor of an electronic device, cause the electronic device to:
   extract parameters from each of the images;
   quantize the parameters of each of the images to obtain quantization data of each of the images; and
   classify the images according to the quantization data of each of the images;
   wherein the instructions further cause the electronic device to classify the images by:
   setting a number of groups;
   selecting an image for each of the groups from the images;
   setting quantization data of the selected image to be reference data of each of the groups;
   calculating a difference value between the quantization data of each of the images and the reference data of each of the groups using a predetermined formula;
   determining a minimum difference value for each of the images; and
   executing a first classification of the images by allocating each of the images to a group that corresponds to the minimum difference value of each of the images.

10. The non-transitory storage medium according to claim 9, wherein after executing the first classification of the images, the instructions further cause the electronic device to classify the images by:

(a) calculating average quantization data of the images in each of the groups, and setting the average quantization data of each of the groups to be updated reference data of each of the groups;

(b) determining whether the updated reference data of each of the groups is within a predetermined ratio range of the reference data of each of the groups;

(c) when the updated reference data of one of the groups is not within the predetermined ratio range of the reference data of the group, calculating an updated difference value between the quantization data of each of the images and the updated reference data of each of the groups using the predetermined formula;

(d) determining a minimum updated difference value for each of the images, and executing a secondary classification of the images by allocating each of the images to a group that corresponds to the minimum updated difference value of each of the images; and (e) returning to (a) until the updated reference data of each of the groups is within the predetermined ratio range of the reference data of each of the groups.

11. The non-transitory storage medium according to claim 9, wherein the parameters of each of the images comprise at least one of a captured time, a captured position, a value of red (R) channel, a value of green (G) channel, a value of blue (B) channel, and a human face detection result of each of the images.

12. The non-transitory storage medium according to claim 9, wherein the quantization data of each of the images is recorded using an array.

\* \* \* \* \*